(12) United States Patent
Holeva

(10) Patent No.: US 6,914,961 B2
(45) Date of Patent: *Jul. 5, 2005

(54) SPEED BINNING BY NEURAL NETWORK

(75) Inventor: Lee F. Holeva, Gurnee, IL (US)

(73) Assignee: Teradyne, Inc., Boston, MA (US)

(*) Notice: Subject to any disclaimer, the term of this patent is extended or adjusted under 35 U.S.C. 154(b) by 354 days.

This patent is subject to a terminal disclaimer.

(21) Appl. No.: 10/260,950

(22) Filed: Sep. 30, 2002

(65) Prior Publication Data

US 2004/0062360 A1 Apr. 1, 2004

(51) Int. Cl.[7] .......................... H04M 1/24; H04M 3/08; H04M 3/22

(52) U.S. Cl. .................. 379/1.04; 379/1.03; 379/22.02; 379/24; 379/27.01

(58) Field of Search ............................. 379/1.01, 1.03, 379/1.04, 9, 15.03, 22, 22.01, 22.02, 22.03, 24, 27.01, 27.02, 27.03, 30

(56) References Cited

U.S. PATENT DOCUMENTS

| | | | |
|---|---|---|---|
| 5,758,027 A | | 5/1998 | Meyers et al. ................. 395/21 |
| 6,263,048 B1 | * | 7/2001 | Nelson et al. ............ 379/27.03 |
| 6,292,539 B1 | * | 9/2001 | Eichen et al. ............... 379/1.04 |
| 6,349,130 B1 | * | 2/2002 | Posthuma et al. .......... 379/1.04 |
| 6,385,297 B2 | | 5/2002 | Faulkner et al. ........... 379/1.04 |
| 6,445,773 B1 | * | 9/2002 | Liang et al. ................ 379/1.04 |
| 6,687,336 B1 | * | 2/2004 | Holeys ....................... 379/1.04 |
| 6,741,676 B2 | * | 5/2004 | Rudinsky et al. ......... 379/27.04 |
| 6,781,386 B2 | * | 8/2004 | Le Henaff ................... 324/534 |

FOREIGN PATENT DOCUMENTS

| | | | |
|---|---|---|---|
| EP | 0722164 | 7/1996 | ............. G10L/5/06 |
| WO | 98/44428 | 10/1998 | ........... G06F/15/18 |
| WO | 01/24490 | 4/2001 | ............ H04M/3/22 |

OTHER PUBLICATIONS

Rye Senjen, et al., "Ybrid Expert Systems for Monitoring and Fault Diagnosis", Mar. 1, 1993.

Pedrycz, Witold, "Conditional Fuzzy Clustering In the Design of Radial Basis Function Neural Networks." IEEE Transactions on Neural Networks, vol. 9, No. 4, Jul. 1998.

* cited by examiner

*Primary Examiner*—Quoc Tran
(74) *Attorney, Agent, or Firm*—Wolf, Greenfield & Sacks, P.C.

(57) ABSTRACT

A method of allocating subscriber lines in a telecommunications network into speed bins. With the method, more intelligent business actions can then be taken in the provision of high-speed data services over the subscriber lines. For example, only qualified lines might be used for high-speed data services, with the other lines being allocated to POTS service. The lines are divided into speed bins using a pair of neural networks, with one predicting upstream speed and one predicting downstream speed. The combined predictions are then mapped to a speed bin, which is the basis for further business actions. The disclosure describes that the neural networks are created using conditional fuzzy logic to precondition the neural networks by line speed.

17 Claims, 4 Drawing Sheets

SPEED BINNING BY NEURAL NETWORK

BACKGROUND OF THE INVENTION

This application relates generally to communications networks, and more particularly, to testing communication lines.

Recently, there has been an increased demand for plain old telephone systems (POTS's) to carry high-speed digital signals. The demand has been stimulated by home access to both the Internet and distant office computers. Both types of access typically employ a POTS line as part of the path for carrying digital signals.

POTS's lines were built to carry voice signals at audible frequencies and can also carry digital signals as tones in the near audible frequency range. Modem digital services such as ISDN and ADSL transmit data at frequencies well above the audible range. At these higher frequencies, POTS's lines that transmit voice signals might transmit digital signals poorly. Nevertheless, many telephone operating companies (TELCO's) would like to offer ISDN and/or ADSL data services to their subscribers.

Telephone lines between a TELCO switch and a subscriber's premises are frequent sources of poor performance at the high frequencies characteristic of ISDN and ADSL transmissions. Nevertheless, high cost has made widespread replacement of these subscriber lines an undesirable solution for providing subscribers with lines capable of supporting ISDN and ADSL. A less expensive alternative would be to use only those subscriber lines that are acceptable for transmitting high-speed digital data or to replace those that are not.

To enable limited replacement of inadequate lines, TELCO's have placed some emphasis on developing methods for predicting which subscriber lines will support data services, such as ISDN and ADSL. Some emphasis has been also placed on predicting frequency ranges at which such data services will be supported. Some methods have also been developed for finding faults in subscriber lines already supporting data services so that such faults can be repaired.

Current methods for predicting the ability of subscriber lines to support high-speed digital transmissions are typically not automated and labor intensive. Often, these methods entail using skilled interpretations of high frequency measurements of line parameters to determine data transmission abilities. At a network scale, such tests are very expensive to implement.

The problem of qualifying lines for data services has been described in several patents. U.S. Pat. No. 6,385,297 by Faulkner, et al. which is hereby incorporated by reference.

Use of neural networks for finding faults on a telephone line was described in PCT Application WO98/4428 "System and Method for Telecommunications System Fault Diagnosis". However, that patent does not recognize the value of using a neural net to qualify a line for high-speed data services nor does it describe an appropriate neural net topology for that purpose.

Using a neural network for line qualification is more directly described in Line Qualification with Neural Networks, 09/409,141 published as PCT application WO 00/25206, which is hereby incorporated by reference. However, it would be desirable to improve upon that technique to obtain more accurate results, such as by decreasing the number of lines that are incorrectly classified as unable to support high speed data services without unacceptably increasing the number of lines that are incorrectly classified as capable of supporting high speed data services. It would also be desirable to accurately predict the speed at which a particular line under test can operate.

SUMMARY OF THE INVENTION

Accordingly, it is an object of the invention to accurately predict the maximum possible operational speed of a particular line under test when used to carry high-speed data signals.

The foregoing and other objects are achieved in a test system that receives electrical measurements on the line under test. These measurements are processed to predict the operational speed of the line under test.

In a preferred embodiment, the processing is performed using two neural networks. One predicts the upstream data rate of the line and the other predicts the down stream data rate of the line. These speed predictions are then matched to a speed bin corresponding to a level of service offered by the telephone company.

In one aspect, the pairs of neural networks are switch dependent. Due to the differing electrical characteristics of different switch types the speed estimating neural networks are associated with a switch. Knowledge of the type of switch being used is then used to select the appropriate pair of neural networks.

In a preferred embodiment, the neural networks are created using conditional fuzzy clustering of data in a training set. Clusters in the training set are initially established by segmenting lines in the training set into groups based on the actual line speed. Each group represents a range of line speeds, or a generic speed bin. The generic speed bins are selected so that the output layer may interpolate speed values with reasonable accuracy. Preferably, the speed bins overlap such that some data points are assigned to more than one group. Clusters are then defined in mathematical form based on the groupings. The mathematical expression of a cluster allows a computation, for any data point, of the closeness of that data point to the cluster. A correlation function is also defined that correlates the indications of how close a data point is to each of the clusters into an overall prediction of line speed.

By iteratively processing the training set, the mathematical description of each of the clusters and the correlation function is adjusted to minimize the error between the predicted line speed and the known line speed for every line in the training set. Once the definition of the clusters and the correlation function are set, these values are used in the neural network.

BRIEF DESCRIPTION OF THE DRAWINGS

Other features and advantages of the invention will be apparent from the following description taken together with the drawings in which.

DESCRIPTION OF THE PREFERRED EMBODIMENTS

Figure 1:
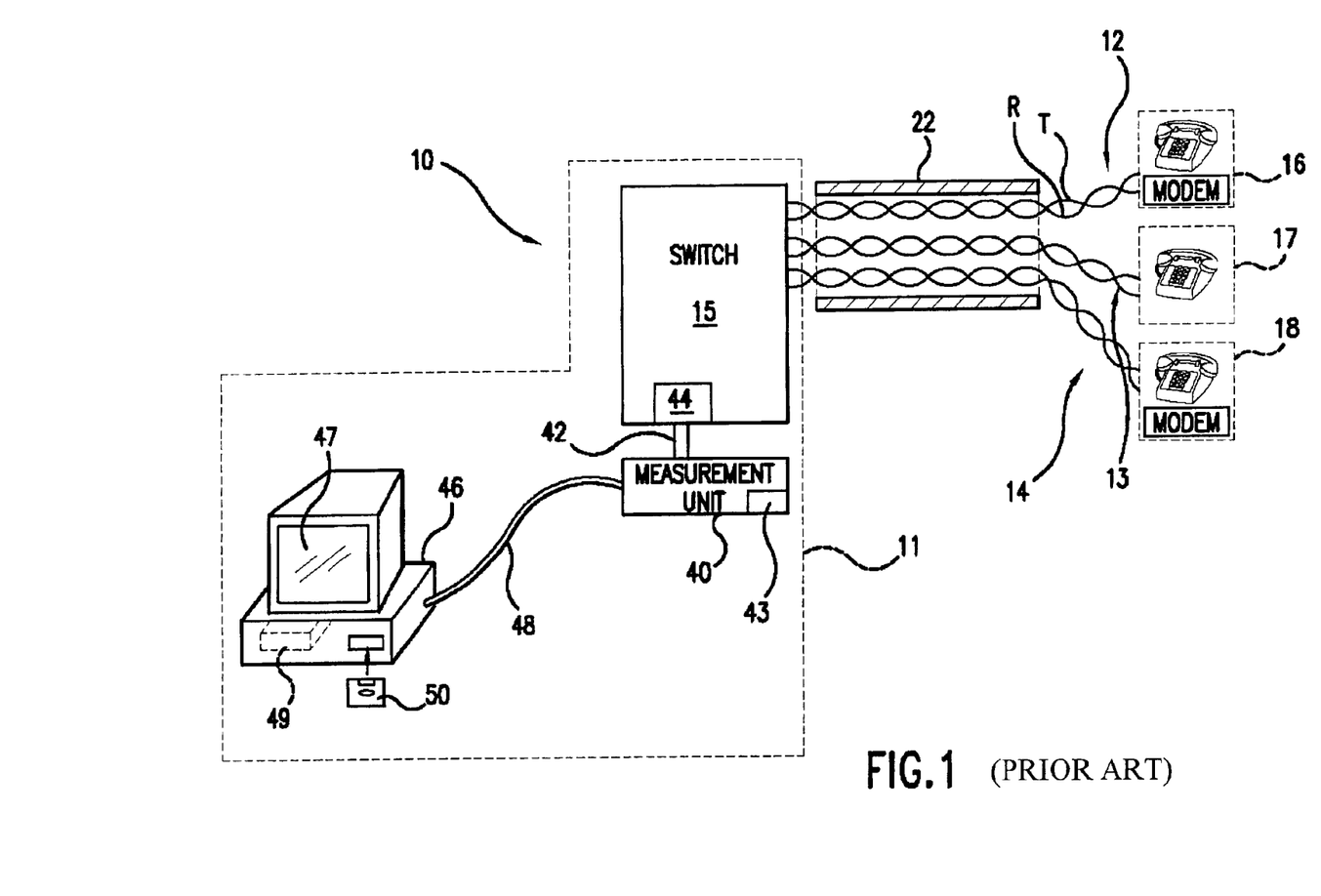
FIG. 1 shows a portion of a POTS network having a system for testing subscriber telephone lines.

FIG. 1 shows a portion of a POTS network 10 that includes a system 11 for testing subscriber lines 12–14. The subscriber lines 12–14 connect subscriber units 16–18, i.e., modems and/or telephones, to a telephony switch 15. The switch 15 connects the subscriber lines 12–14 to the remainder of the telephone network 10. The switch 15 may be a POTS switch or another device, e.g., a digital subscriber loop access multiplexer (DSLAM). The switch 15 and testing system 11 may be located in one or more switching stations of a TELCO.

In the preferred embodiment, each subscriber line 12–14 consists of a standard twisted two-wire telephone line adapted to voice transmissions. The two wires are generally referred to as the ring R and tip T wires.

A large portion of each subscriber line 12–14 is housed in one or more standard telephone cables 22. The cable 22 carries many subscriber lines 12–14, e.g., more than a dozen, in a closely packed configuration. The close packing creates an electrical environment that changes transmission properties of the individual subscriber lines 12–14.

A measurement unit 40 performs electrical measurements, used in tests of the lines 12–14. The measurement unit 40 includes a device 43 that performs one-ended electrical measurements on tip and ring wires of the lines 12–14. Generally, these measurements will be expressed as admittances. The measurement unit 40 may also house other devices (not shown) for performing other types of one-ended electrical measurements, e.g., to test the line for selected line faults. The measurement unit 40 couples to the switch 15 via a test bus 42.

The device 43 connects to the switch 15 through the test bus 42 and a standard voice test access 44. The voice test access 44 electrically connects the device 43 to the subscriber lines 12–14 selected for testing. The voice test access 44 can only transmit electrical signals having frequencies between about 100 Hertz (Hz) and 20 kilo Hz (KHz), i.e., low compared to frequencies used by ISDN and ADSL data services.

The measurement unit 40 is controlled by computer 46, which selects the types of measurements to perform and the subscriber lines 12–14 to test. The computer 46 sends control signals to the measurement unit 40 and receives measurement results from the measurement unit 40 via the same line 48.

The computer 46 executes a software program to control line testing by the measurement unit 40. The program also processes and interprets the results from the measurement unit 40 to determine whether to qualify or disqualify the lines 12–14 for preselected high-speed data services. The software program is stored, in executable form, in a data storage device 49, e.g., a hard drive or random access memory (RAM). The program may also be encoded on a readable storage medium 50, such as an optical or magnetic disk, from which the program can be executed.

To perform a test, the measurement unit 40 signals the voice test access 44 to disconnect a selected line 12–14 from the network 10 and to reconnect the line 12–14 to wires of the bus 42 connecting to the internal device 43. Then, the internal device 43 performs one-ended electrical measurements on the selected line 12–14. After the measurements are completed, the measurement unit 40 signals the switch 15 to reconnect the line 12–14 to the remainder of the POTS network 10.

The computer 46 can qualify or disqualify selected subscriber lines 12–14 for data services prior to fully connecting the lines 12–14 to the subscriber units 16–18. Qualification is based on determining, with high certainty, that a selected line 12–14 will support a specified data service. Disqualification is based on determining, with high certainty, that the selected line 12–14 will not support the specified data service.

In the preferred embodiment, the output of computer 46 will be more than a simple indication of whether the line under test can carry high-speed data services. Many telephone companies offer high-speed data services at different levels. They charge more for service that carries more data. Furthermore, many high-speed data services are "asymmetrical"—meaning that the rate subscribers can send data from their computers into the network (the "upstream" data rate) is different from the rate at which the subscribers can receive data over the network (the "downstream" data rate). In predicting overall line speed, it would be most useful to match a particular line under test to a category defined by the telephone company based on both the upstream and downstream data rates of the line.

Figure 2:
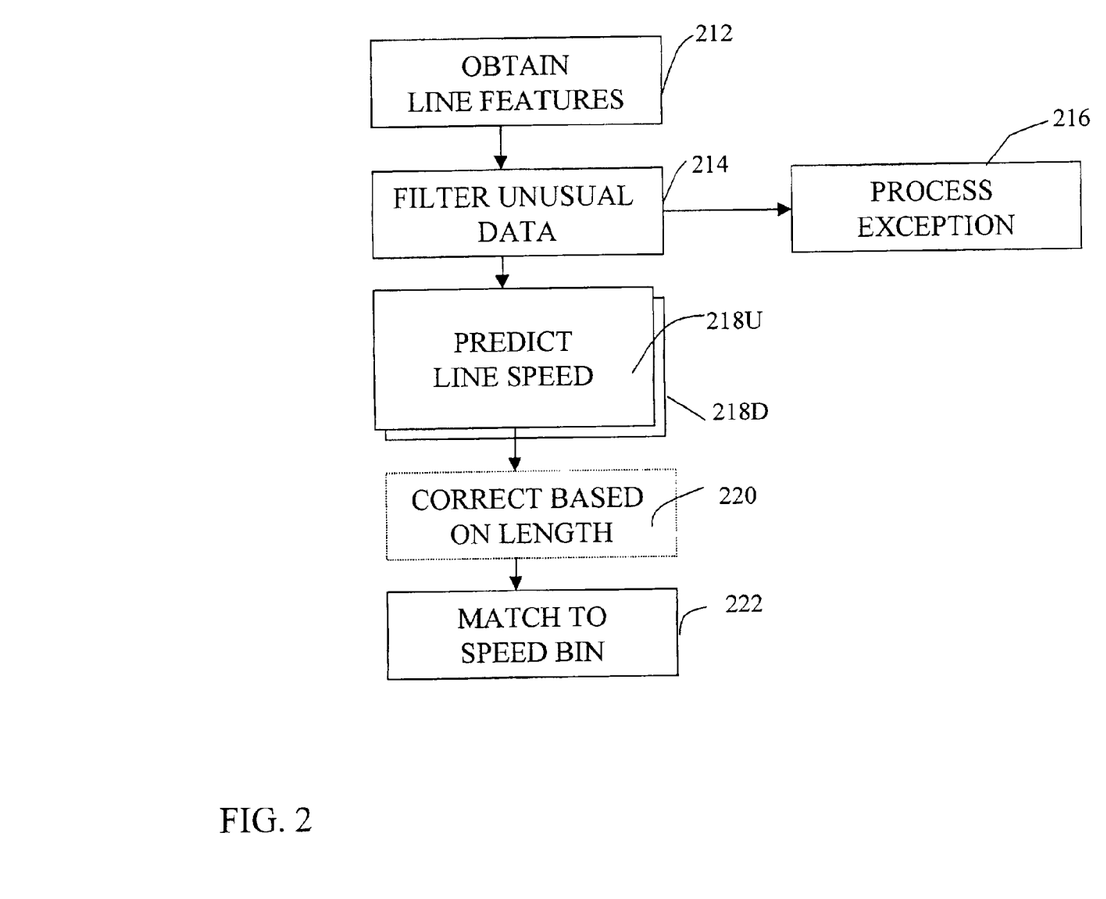
FIG. 2 is a flow diagram of a method for predicting the performance of a telephone line.

Turning to FIG. 2, a flow chart of the software within computer 46 is shown. The precise manner of implementing this software is not critical to the invention. Any suitable programming language might be used.

The flow starts at step 212. At this step, features of a line under test are obtained. These features are obtained from the electrical measurements made on the line under test with a measurement unit 40. In a preferred embodiment, the process is initiated by a human operator accessing computer 46 for information on a particular line or a set of lines to take a business action—such as informing a particular subscriber already connected to that line for POTs whether they can receive high speed data services over the same line. However, it is also possible that the entire process to be described might be run on sets of lines in response to human instructions or on a periodic basis so that the telephone company can keep a list of telephone lines that can be used for high speed data services. Or, the results might be used to set or otherwise adjust billing rates for a particular subscriber based on the level of service their line can provide.

Possibly, the raw measurements might be directly used for predicting performance. However, it is generally known in the art of neural networks that some variables are more highly correlated to the output variable than others. It is also known that combinations of variables are sometimes better predictors of line performance than the variables alone.

Therefore, part of the step of obtaining line features is pre-processing the raw measurements to eliminate the variables that are not well correlated to the output prediction being made or combing measurements to make derived variables that are more useful in making the desired prediction.

Other data processing might also be employed as part of the acquisition of the data. For example, the raw measurements might be filtered to reduce noise effects. Additionally, the values of the measurements might be scaled to remove influences unrelated to the actual condition of the line. For example, a normalization to remove the impact of drive voltage used to make the measurements is important.

It is known in the art that various automated processing techniques can be used to process a set of data to aid in identifying input variables, or combinations of input variables, that are correlated to the output that is being predicted. Such techniques might be employed here.

In the preferred embodiment, the test system makes a plurality of electrical measurements over a relatively low frequency range. For example, there might be 45 measurements taken at frequencies between 100 Hz and 20 kHz. Preferably, these measurements are admittance measurements. In the described embodiment, these measurements might be tip-to-ground conductance, tip-to-ground susceptance and the derivative of the tip to ground conductance functions. These measurements are initially translated into two types of derived variables.

One set of derived variables is the "normalized moments." First and second order moments are used in the preferred embodiment. The moments are computed as the sum of each of the measurements (offset by the minimum measurement to avoid any negative results) weighted by $i^k$. In this case, k represents the order of the moment and will be 1 for a first order moment or 2 for a second order moment. Also, i represents the order of the measurement. If there are 45 measurements taken at different frequencies, i will range from 0 to 44. The moments are normalized by dividing by the 0 order moment, which is computed as above with k=0. Separate moments are computed for tip-to-ground conductance, tip-to-ground susceptance and the derivative of the tip to ground conductance functions.

A second set of derived variables comes from the Fourier transform of these same measurements. As in the computation of the moments, each of the series is offset by the minimum value to avoid the impact of negative numbers before the Fourier transform is computed. Because each measured series contains 45 values—representing measurements at 45 different frequencies—the Fourier series of each value would contain 45 values. However, all of the values are divided by the first value in the series for normalization.

An example of another derived variable is called the Roger factor. This value, for a particular line, is computed from complex voltage measurements on the legs of the line at some known drive condition. In the preferred embodiment, there are a series of 45 measurements taken at different frequencies from 0 (DC) to about 20 kHz. For this computation, only the DC and subsequent four measurements are used. For each of the tip and ring lines, those values are averaged and normalized by the DC value. The logarithm (base 10) of this average value is computed for each of the tip and ring lines separately. Then, these values are in turn averaged to create a single number characterizing the line, which is termed the "Roger factor."

A string of variables, in a particular order, is sometimes called a "vector." The result of step 212 is an input "vector". In this case, the vector will consist of the normalized first and second order moments of tip-to-ground conductance, tip-to-ground susceptance and the derivative of the tip to ground conductance functions. These values will be followed by the normalized Fourier coefficients for the same measurements. In a preferred embodiment, only the first three coefficients following the $0^{th}$ term are used. The final value of the input vector is the Roger factor.

At step 214, the input vector or the raw measurements are processed to detect exception conditions. Exception conditions could indicate that there was a problem in making measurements. Or the exception condition could indicate that the line under test has a fault condition or other condition making it different than the lines in the training set used to create the prediction blocks 218 (described below). For example, a voltage measurement might unexpectedly be greater than the total applied voltage, indicating a potential problem with the measurement. Or, the measurements might indicate that the two legs of the line under test are electrically imbalanced. In that case, the line might not match any lines in the training set and applying the normal data processing steps might lead to an incorrect result. Previous patent applications owned by Teradyne, Inc. describe techniques for detecting line faults that might interrupt high-speed data services. Method and Apparatus for Qualifying Loops for Data Services, U.S. Pat. No. 6,385,297 by Faulkner et al., Predicting Performance of Telephone Lines for Data Services, U.S. application Ser. No. 09/294,563 published as WO 00/64132 by Groessl et at, Technique for Estimation of Insertion Loss, U.S. application Ser. No. 10/220,716, published as WO 01/67729 by Faulkner, Qualifying Lines for Data Transmission, U.S. application Ser. No. 10/019,589 published as WO 01/01597 by Faulkner; Determining the Physical Structure of Subscriber Lines, U.S. application Ser. No. 09/410,236 published as WO 00/64130 by Rudinisky et al.; Fault Conditions Affecting High Speed Data Services, U.S. Pat. No. 6,389,109 by Schmidt et al.; Line Qualification By Neural Network, U.S. application Ser. No. 09/409,141 publishes as WO 01/24490 by Holeva; Detecting Faults in Subscriber Telephone Lines, U.S. application Ser. No. 09/410,237 published as WO 01/24492 by McGill et al.; Binning of Results from Loop Qualification Tests, U.S. application Ser. No. 09/692,169 published as WO 01/95597 by Rosen which are hereby incorporated by reference. Any of those techniques might be used. Indicators of bad measurements might include: imbalance and abnormal frequency magnitude, indicated by step increase at high frequencies.

If any exception conditions are found, processing proceeds to step 216. At step 216, a decision might be made to simply repeat the measurements. A retest would be appropriate where the data indicates that there was likely a problem in making a measurement. However, when the processing at step 214 indicates that the line has a problem that precludes its use for speed qualification, no further analysis is performed and this result is reported.

If no exception conditions are found, processing proceeds to step 218. Step 218 consists of step 218U and 218D. At step 218U, the upstream data rate will be predicted. The processing at each of these steps will be in the same format. However, specific values might be different, reflecting the possibility of different operating characteristics or frequency ranges in the upstream and downstream channels. The specific processing to be performed will be described in greater detail in connection with FIG. 3.

Next, the speed predictions can be optionally corrected based on the length of the line. Step 220 illustrates this correction step.

It is generally known that the length of a line influences its performance for carrying high-speed data signals. An estimate of line length is sometimes made from the measured capacitance on the line. Measurement unit 40 can make such a measurement. If desired, this measurement can be used to weight the speed predictions from step 218, possibly decreasing the speed prediction when the line is long.

At step 222, the line is matched to a particular speed bin based on a predicted upstream and downstream speed. For example, TABLE 1 is an illustration of a service level chart that a telephone company might use.

TABLE 1

| Service Level | Minimum Downstream Speed | Minimum Upstream Speed |
| --- | --- | --- |
| 0 | <190 k | <190 k |
| 1 | 190 k | 190 k |
| 2 | 450 k | 450 k |

TABLE 1-continued

| Service Level | Minimum Downstream Speed | Minimum Upstream Speed |
| --- | --- | --- |
| 3 | 750 k | 500 k |
| 4 | 1,500 k | 500 k |
| 5 | 2,000 k | 650 k |
| 6 | 4,000 k | 650 k |

The table allows the two separate speed predictions to be combined into prediction of one service level. The matching can be relatively straightforward. The downstream speed and the upstream speed might be compared separately to the speeds listed in the table to find the highest service level for which the predicted upstream or downstream speed, respectively, exceeds the minimum for that service level. Then, the lower of the two service levels would be selected.

More complicated processing might alternatively be used to process the results. As will be described in greater detail below, step 218 outputs a predicted speed and a probability factor indicating the likelihood that the line under test actually will achieve that rated speed. For example, in cases where the predicted speed is close to the minimum rated speed of a particular service level, the probability factor might be checked. If there is a low probability that the line will achieve the rated speed, it might be assigned a service level.

Business factors might also influence the assignment of lines to service levels. For example, if there is a prediction that a line has an upstream speed that qualifies it for a very low service level but a downstream speed that would qualify it for a much higher service level, the line might be assigned a service level that is the average of the two service levels.

Regardless of the precise mechanism by which the speed predictions are matched to service levels, the result is reported for use. The report might be made to a human operator that requested a line under test. Alternatively, the result might be stored into a database for later evaluation in selecting a particular line to connect to a subscriber's premises, setting a billing rate, or taking some other business action.

Figure 3:
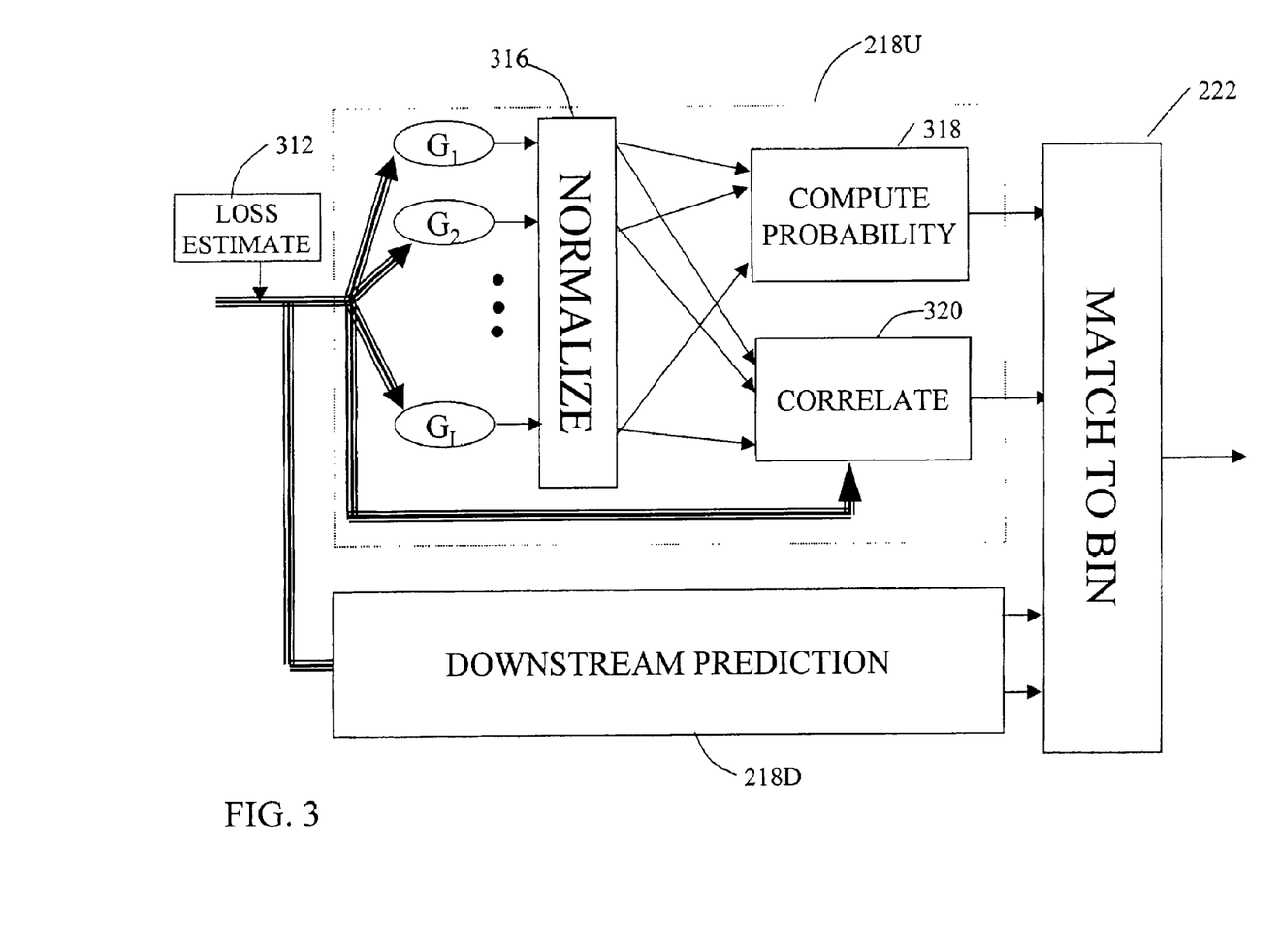
FIG. 3 is a functional block diagram of the line speed prediction of FIG. 2.

Turning now to FIG. 3, further details of the speed prediction step 218 are shown. FIG. 3 shows a functional block diagram of software inside computer 46 that performs speed prediction.

Speed prediction for upstream and downstream data rates are performed separately. Element 218U represents the processing to make an upstream speed prediction and 218D represents the processing to make a downstream speed prediction. Details of only element 218U are shown for simplicity. Element 218D has a comparable form, though different data values are used.

The input to FIG. 3 is the input vector formed at step 212. In the preferred embodiment, the input vector is augmented with a further variable that represents a loss estimate. This value represents an estimated loss of the line at a particular frequency, such as 300 kHz, or an average line loss over the range of frequencies used to transmit the high speed data services. Techniques for computing loss can be found in the above-mentioned patent applications and in US application entitled System and Method for Qualification of Telephone Lines for DSL Services Using an Average Loop Loss, U.S. application Ser. No. 10/176,014 by Afzal, which is hereby incorporated by reference. Of significance, these techniques allow computation of loss at a higher frequency even though relatively low frequency measurements are available. Augmenting the input variable in this fashion is not necessary, but we have observed that it increases the accuracy of the speed prediction.

The input vector is then applied to a plurality of Gaussian units $G_1 \ldots G_L$. Each Gaussian unit is a mathematical representation of a "cluster"—a group of data points in the training set that had the same output classification and characteristics. Formation of the Gaussian units is described in greater detail below in conjunction with FIG. 4.

When the input vector is applied to a Gaussian unit, the Gaussian unit outputs a value indicating the similarity of the line under test to the lines in the training set that were used to create that cluster. Thus, when clusters are created based on speed bins, the output of each Gaussian unit indicates the likelihood that a particular line under test will exhibit an actual performance falling in the speed bin associated with that Gaussian unit.

The output of all the Gaussian units are connected to a normalization function 316. The outputs can be normalized by simply summing the outputs of all the Gaussian units and dividing each output by the sum. The normalized outputs of all the Gaussian units will sum to 1 to facilitate further processing. The normalized outputs of all the Gaussian units can also be thought of as a vector.

At step 320, the outputs of all the Gaussian units are combined to create a speed prediction. Mathematically, this operation is performed as a matrix multiply of the vector output form normalization step 316. A weight matrix, W, is computed from the training data as will be described in greater detail in connection with FIG. 4.

In the illustrated embodiment, a first order NRBF neural network is used. In a first order net, the input vector, or some subset of it, is fed forward and also used in the speed prediction at step 320. When the input vector is fed forward, the product of the normalized Gaussian vector is multiplied by the weight matrix, W and that product is then multiplied by the input vector. Where the input vector is fed forward and used in making a speed prediction, the characteristics of the matrix W will be different than if the input is not fed forward. But, computation of a weighting matrix is known in the art of neural network design.

The outputs of the Gaussian units are also fed to step 318. At step 318, a factor is computed that indicates the probability that the line under test has the predicted speed. For example, if the output of one of the Gaussian units is much higher than all of the others, the line will be assigned a speed prediction that correlates with the speed of the lines in the cluster used to create that Gaussian unit and there will be a relatively high probability that the speed prediction is accurate. If two Gaussian units have outputs that are much higher than all of the others, and those Gaussian units correlate with clusters that have contiguous speed bands, the line under test is likely to receive a speed prediction that is in between those two bands and this prediction can also be made with a high level of confidence. However, if the Gaussian units with high outputs correspond to widely different speed bands, the line might be assigned to a one speed band or the other. Or, it might be assigned to a speed band somewhere in between, even though the Gaussian unit associated with that intermediate speed band indicated that the line under test did not match well with other lines in the speed band. In this situation, there is a much lower probability that whatever speed prediction is made is accurate. A similar situation results when none of the Gaussian units has an output significantly higher than the others.

To make the prediction of a probability, step 318 accepts as inputs the outputs of the Gaussian units. It also accepts as input a topology vector. The topology vector indicates the mapping between the various Gaussian units and particular generic speed bins. This information is used in the probability prediction to determine whether those Gaussian units with larger outputs correspond to similar speed bins. In fact, in the course of identifying clusters before the Gaussian units are formed, it could happen that one cluster of lines is of such an irregular shape that it is most accurately represented mathematically as two smaller clusters. In this case, the Gaussian units corresponding to the smaller clusters would correspond with the same speed bin. Thus, if outputs of both of these Gaussian units is high, rather than indicating uncertainty in the classification of the line, indicates a relatively high degree of certainty.

Using a topology vector in this fashion to determine a probability factor is well known in the art of neural network design.

Downstream prediction 218D is similarly made up of Gaussian units. The number and mathematical description of the Gaussian units is likely to be different than in 218U. The weighting matrix W is also likely to be different. Further, the topology vector will also be different. However, the overall construct and processing steps will be the same.

Once the upstream and downstream speed predictions and probabilities are determined, they are fed to step 222. As described above, this step produces an output, preferably in the form of a service level classification that the telephone company can use in making business decisions.

Figure 4:
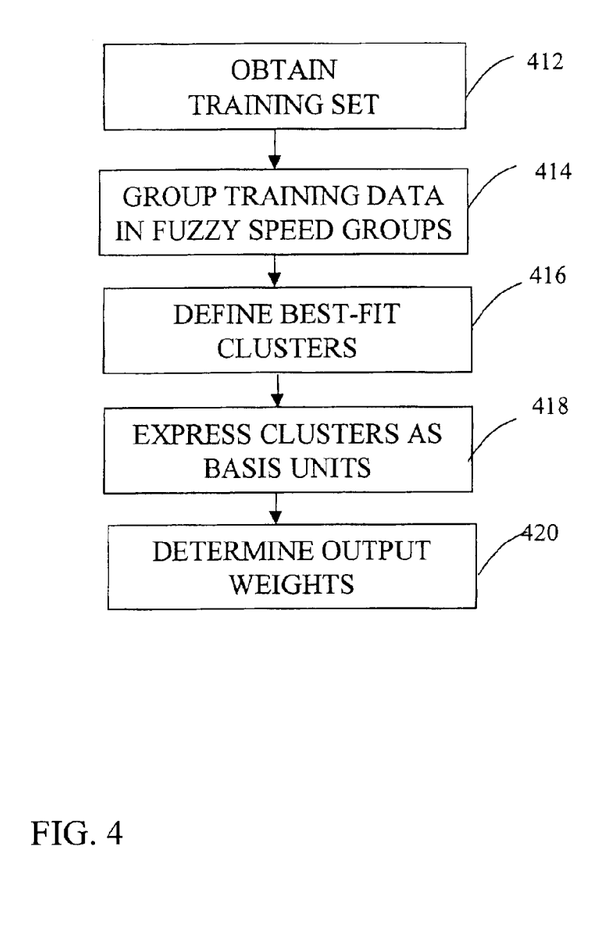
FIG. 4 is a flow diagram of a method for creating software to perform the functions illustrated in FIG. 3.

Turning now to FIG. 4, the steps needed to create the neural network are described. The neural networks are created through a process called Conditional Fuzzy Clustering. It is described in a paper called *Conditional Fuzzy Clustering in the Design of Radial Basis Function Neural Networks* by Pedrycz, W. IEEE Transactions on Neural Networks, Vol. 9, No. 4, July 1998 pp. 601–612, which is hereby incorporated by reference.

The first step in the process is to obtain training data. In the preferred embodiment, the training data comes from actual measurements on lines in a network known to be similar to the network in which test system 10 will be deployed. One-ended measurements would be used because during a test only one-ended measurements would be made. However, to more accurately determine the speed of the line, two ended measurements would be made.

We have determined that the type of switch 15 used in the network greatly impacts the correlation between measurements made through the switch and the prediction of line performance made with those measurements. Thus, training data should also be taken through a switch of the type likely to be found in the network in which the test system will be deployed.

Once the data is collected, each line in the training set must be represented as a vector and a classification. The classification is the actual speed of the training line. The vector is a vector in the same form as the input vector defined above.

At step 414, an initial grouping of data points from the training set is made. It is not necessary, and in a preferred embodiment is not desired, that each data point from the training set be assigned to only one group.

The grouping can be made mechanistically. In the preferred embodiment, the initial groupings are made mechanically by line speed. Lines are grouped by speed into triangularly shaped fuzzy sets. The fuzzy sets are arranged so that neighboring fuzzy sets overlap. This results in an overlap of the basis units which leads to accurate interpolation For example, data points corresponding to lines withspeeds of 0 to 200 kbps are assigned to the first group. The second group is made up of lines having speeds from 0 to 400 kbps. The next group is made up of lines having speeds of 200 kbps to 600 kbps. The groupings continue in this fashion for 400 kbps to 800 kbps; 600 kps to 1000 kbps, etc. With this grouping, there is complete overlap, and each data point falls into two groups.

The initial grouping could also be done with manual intervention. For example, the speeds of the data points might be plotted and the plot examined for patterns or clusters of lines of similar speeds. Groupings might then be defined based on the observations. Regardless of how the initial clusters are defined, making an initial allocation of the data points to groups is called "conditioning." In the preferred embodiment, the data points are "conditioned by speed."

Once initial clusters are created, a mathematical description that approximates the cluster is created. In simplest form, the description provides, for each variable in the input vector, a center value and a range of values around that center. This information defines boundaries of the cluster.

Such a simplified description of the clusters will not usually result in a perfect match to the data points in the training set. And, because the initial clusters were selected so that data points could be assigned to more than one cluster, there will not be further imprecision in using the initial clusters to make assignments based on speeds. Nonetheless, this initial mathematical description of the clusters can be used to create a first pass at the Gaussian units $G_1 \ldots G_L$.

As described above, when a data point, expressed as an input vector, is applied to a Gaussian Unit, the Gaussian Unit outputs a value indicating the likelihood that the data point falls within the cluster defined by that Gaussian Unit. When the input vector has values well outside the boundaries that define the cluster, the output of the Gaussian Unit should be relatively low. Conversely, when the input vector has values very close to the central points of the cluster, the output should be relatively high. Formulas for comparing each input vector to the mathematical description of a cluster are known in the art.

Ideally, the cluster boundaries should be drawn in such a way that when the data points in the training set are applied to the Gaussian Units created from the clusters, there is overall a good fit. In the art of neural network design, a good fit is achieved by defining an error or cost function. The error function is a mathematical expression for how correlated the output of the Gaussian Units are to the categories that the neural network is to identify. In constructing a neural network, it is conventional to adjust the description of the clusters to try to minimize the error function.

At step 416, an iterative process is performed during which the clusters are adjusted to reduce, and ideally to minimize, the error function. The mathematical description of the cluster boundaries might be adjusted or certain clusters might be combined, while other clusters might be divided into multiple separate clusters. In this way, the process produces Gaussian Units that better indicate the speed classification of any given line under test.

In the preferred embodiment, the Mahalobis distance of each of the points in the training set relative to the cluster centers is used as an indication of how well each data point fits within the cluster. A summation of the distances for all of the data points provides an indication of how well the cluster boundaries have been defined.

As part of the process of creating the neural network, the weight matrix, W, is also adjusted. As described above, the weight matrix links the outputs of the basis units to an actual prediction. At the end of the iterative process when the clusters are determined, the weight matrix is also established. At step 420, the weight matrix is adjusted. Preferably, the weight matrix is also set such that an error function is minimized. This error function represents the difference between the output of a neural network, using the above defined Gaussian units and a trial weight matrix map all the data points in the training set to the desired classification. For each data point, an output is predicted and the difference between the actual classification of that data point and the predicted one is expressed numerically. These differences, expressed numerically, are combined for all of the data points in the training set. The process of selecting coefficients for the weight matrix involves minimizing this value.

In the preferred embodiment, the difference is expressed as a squared error and Thikonov Regularization is used to prevent a small change of the input from producing large a change of the output. A modified form of the Levenburg-Marquardt algorithm, standard Levenburg-Marquardt with an added regularization term, is then used to adapt the output weight matrix, W.

In the preferred embodiment, the neural network is a created through conditional fuzzy clustering as described in paper called *Conditional Fuzzy Clustering in the Design of Radial Basis Function Neural Networks* by Pedrycz. The training of the neural network can be implemented using commercially available programs. For example, Matlab could be used. Computer code written in C++ might also be used to implement the resulting test system.

Having described one embodiment, numerous alternative embodiments or variations might be made. For example, the test system with only one neural network for upstream and downstream data rate prediction was described. It was described above that obtaining data for a training set at step 412 includes acquiring data for a network representative of the one in which the test system will be installed. Other factors might also be considered. For example, the type of modems used by the telephone company and the subscriber might influence the ultimate data rate of the line. Therefore, it might be desirable to obtain multiple sets of training data, with each training set obtained with a different modem pair or other differences in operating conditions. The different neural nets that would result from using the different sets of training data would each be loaded into the test system. In making a speed prediction, it would be preferable to know which modem pair would be used so that the most applicable neural net could be selected. When information on the modems to be connected to the line under test is not available, an alternative would be to predict speed with each neural net and, in cases where the modems used would result in a different prediction of speed, this information could be presented to the user.

Also, FIG. 1 depicts a network with a single measurement unit connected to it. It should be appreciated that a network might have numerous subscribers and more than one measurement might be connected into the network to acquire data on all desired lines under test. Preferably, a single computer 46 would receive data from all the measurement units. In this way, a telephone company representative might receive data on any line in the network. However, the data might alternatively be gathered and processed on separate computers attached to each measurement unit with end results only being passed back to a central location when needed.

Step 220 describes an optional correction based on the length of the line. An alternative way to factor length into the speed prediction is to have different neural networks created for different lengths. If sufficient training data is available, that data might be broken up into different training sets, with each set of data representing lines of different of similar lengths. Each of the sets would be used to create a neural network according to the process in FIG. 4. When conducting a test on a particular line, the estimated length of the line would be used to select which of the neural nets to use for the speed prediction.

As a further example, it was described that the neural network was programmed using training data taken through a switch of the type that is to be found in network where the test system will be deployed. This implementation assumes that there will be only one type of switch used throughout the network. If multiple switch types are used, computer 46 could be programmed with multiple neural networks for upstream and downstream prediction, with different neural networks being used for different switch types. In this case, the first sub-step in step 218 would be to select a neural network that is appropriate for the type of switch through which the data was collected.

Therefore, the invention should be limited only by the spirit and scope of the appended claims.

What is claimed is:

1. A method of operating a telecommunications network having a plurality of subscribers connected to a switch through a plurality of subscriber lines, the method comprising:
   a) making a plurality of one-ended electrical measurements on a subscriber line;
   b) preparing a feature vector from the electrical measurements;
   c) applying the feature vector to a first neural network to predict upstream data rate of the subscriber line if used to provide high speed data services;
   d) applying the feature vector to a second neural network to predict the downstream data rate of the subscriber line if used to provide high speed data services;
   e) combining the output of the first neural network and the second neural network to predict a service level of the subscriber line;
   f) taking a business action related to the delivery of high speed data services based on the service level for the subscriber line.

2. The method of claim 1 wherein the business action comprises allocating the subscriber line for use in providing high-speed data services when the predicted service level exceeds a predetermined service level.

3. The method of claim 1 wherein the business action comprises precluding use of the subscriber line for providing high-speed data services when the predicted service level falls below a predetermined service level.

4. The method of claim 1 wherein the business action comprises allocating the subscriber line for use in providing premium high-speed data services when the predicted service level exceeds a predetermined service level.

5. The method of claim 1 wherein the first neural network and second neural network are constructed from a training set using conditional fuzzy clustering to precondition the neural networks by line speed.

6. The method of claim 1 wherein making a plurality of one-ended electrical measurements comprises taking measurements through the switch.

7. The method of claim 1 wherein the one-ended electrical measurements are taken at a range of frequencies that has an upper limit below the operating frequency range of the high-speed data services.

8. The method of claim 7 wherein the range of frequencies for the one-ended electrical measurements are below 20 kiloHertz.

9. The method of claim 1 wherein preparing feature vector comprises deriving values from admittance measurements.

10. The method of claim 1 wherein preparing the feature vector comprises computing normalized moments of tip-to-ground conductance, tip-to-ground susceptance and the derivative of the tip to ground conductance as a function of frequency.

11. The method of claim 10 wherein the moments are computed over a range of frequency measurements below about 20 kHz.

12. The method of claim 1 wherein preparing the feature vector further comprises computing a predetermined number of terms in a Fourier series of admittance measurements.

13. The method of claim 12 wherein the Fourier series are computed on tip-to-ground conductance, tip-to-ground susceptance and the derivative of the tip to ground conductance as a function of frequency.

14. The method of claim 13 wherein the Fourier series are computed for measurements made over a frequency range of about 0 Hz to about 20 KHz.

15. The method of claim 10 wherein preparing the feature vector further comprises computing a predetermined number of terms in a Fourier series of admittance measurements.

16. The method of claim 1 additionally comprising identifying the type of switch used in the telecommunications network and providing the first neural network and the second neural network in response to the identified switch type.

17. The method of claim 16 wherein the step of providing the first neural network and the second neural network comprises acquiring a set of training data representative of a network using the identified switch type and training the first neural network and the second neural network using this acquired training data.

* * * * *